(12) United States Patent
Liao et al.

(10) Patent No.: US 11,270,368 B2
(45) Date of Patent: Mar. 8, 2022

(54) METHOD AND APPARATUS FOR PRESENTING OBJECT BASED ON BIOMETRIC FEATURE

(71) Applicant: Huawei Technologies Co., Ltd., Shenzhen (CN)

(72) Inventors: Heng Liao, Shenzhen (CN); Kangmin Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 365 days.

(21) Appl. No.: 15/669,051

(22) Filed: Aug. 4, 2017

(65) Prior Publication Data
US 2017/0330265 A1  Nov. 16, 2017

Related U.S. Application Data

(63) Continuation of application No. PCT/CN2015/072317, filed on Feb. 5, 2015.

(51) Int. Cl.
| | |
|---|---|
| *G06Q 30/06* | (2012.01) |
| *H04H 60/56* | (2008.01) |
| *H04H 60/64* | (2008.01) |
| *G06Q 50/00* | (2012.01) |

(52) U.S. Cl.
CPC ........ *G06Q 30/0631* (2013.01); *G06Q 50/01* (2013.01); *H04H 60/56* (2013.01); *H04H 60/64* (2013.01)

(58) Field of Classification Search
None
See application file for complete search history.

(56) References Cited

U.S. PATENT DOCUMENTS

| | | | |
|---|---|---|---|
| 2002/0107741 A1* | 8/2002 | Stern | ...................... G06Q 20/20 705/16 |
| 2009/0177528 A1 | 7/2009 | Wu et al. | |
| 2010/0070987 A1 | 3/2010 | Amento et al. | |
| 2010/0249538 A1 | 9/2010 | Pradeep et al. | |

(Continued)

FOREIGN PATENT DOCUMENTS

| | | |
|---|---|---|
| CN | 103257976 A | 8/2013 |
| CN | 103576853 A | 2/2014 |

(Continued)

OTHER PUBLICATIONS

Eye Tracking: What is it for and when to use it, Neil Dawson, Aug. 18, 2014, https://usabilitygeek.com/what-is-eye-tracking-when-to-use-it/ (Year: 2014).*

(Continued)

*Primary Examiner* — Ming Shui
(74) *Attorney, Agent, or Firm* — Conley Rose, P.C.

(57) ABSTRACT

A method for presenting an object based on a biometric feature includes obtaining information about a first object that a user is gazing at, and biometric feature information of the user gazing at the first object; recognizing a satisfaction status for the obtained biometric feature information of the user gazing at the first object; and determining and presenting information about a second object based on the recognition of the satisfaction status for the biometric feature information of the user gazing at the first object.

20 Claims, 9 Drawing Sheets

(56) References Cited

U.S. PATENT DOCUMENTS

| | | | |
|---|---|---|---|
| 2011/0134026 A1 | 6/2011 | Kang et al. | |
| 2013/0054593 A1* | 2/2013 | Park | G06F 16/335 707/736 |
| 2014/0022157 A1* | 1/2014 | Lee | G06F 3/013 345/156 |
| 2014/0026156 A1 | 1/2014 | Deephanphongs | |
| 2014/0344017 A1 | 11/2014 | Deephanphongs et al. | |

FOREIGN PATENT DOCUMENTS

| | | | |
|---|---|---|---|
| CN | 103729586 A | | 4/2014 |
| CN | 104080010 A | | 10/2014 |
| CN | 104620522 A | | 5/2015 |
| JP | 2010233719 A | * | 10/2010 |
| JP | 2010233719 A | | 10/2010 |
| WO | 2007128057 A1 | | 11/2007 |
| WO | 2010123770 A2 | | 10/2010 |
| WO | 2014015075 A1 | | 1/2014 |

OTHER PUBLICATIONS web.archive.org/web/20140823010006/https://usabilitygeek.com/what-is-eye-tracking-when-to-use-it/ (Year: 2014).*

Normal EEG in adults and Pediatrics http://thaiepilepsysociety.com/wp-content/uploads/2013/07/Normal-EEG-in-adults-and-pediatrics.pdf (Year: 2013).*

Foreign Communication Form A Counterpad Application, European Application No. 15880733.9, Extended European Search Report dated Dec. 11, 2017, 9 pages.

Foreign Communication From a Counterpart Application, Chinese Application No. 201580075563.X, Chinese Office Action dated Mar. 14, 2019, 7 pages.

Machine Translation and Abstract of Chinese Publication No. CN103729586, Apr. 16, 2014, 12 pages.

Machine Translation and Abstract of Chinese Publication No. CN104080010, Oct. 1, 2014, 12 pages.

Foreign Communication From a Counterpart Application, PCT Application No. PCT/CN2015/072317, English Translation of International Search Report dated Nov. 10, 2015, 2 pages.

Foreign Communication From a Counterpart Application, PCT Application No. PCT/CN2015/072317, English Translation of Written Opinion dated Nov. 10, 2015, 6 pages.

Machine Translation and Abstract of Chinese Publication No. CN103257976, Aug. 21, 2013, 9 pages.

Foreign Communication From a Counterpart Application, Chinese Application No. 201580075563.X, Chinese Office Action dated Oct. 8, 2018, 5 pages.

Foreign Communication From a Counterpart Application, Chinese Application No. 201580075563.X, Chinese Office Action dated Sep. 19, 2018, 3 pages.

* cited by examiner

METHOD AND APPARATUS FOR PRESENTING OBJECT BASED ON BIOMETRIC FEATURE

CROSS-REFERENCE TO RELATED APPLICATIONS

This application is a continuation application of international Application No. PCT/CN2015/072317, filed on Feb. 5, 2015. The disclosure of the aforementioned application is hereby incorporated herein by reference in its entirety.

TECHNICAL FIELD

The disclosure relates to the field of computers, and more specifically to a method for presenting an object based on a biometric feature, a method for recommending an object based on a biometric feature, an apparatus for presenting an object based on a biometric feature, and an apparatus for recommending an object based on a biometric feature.

BACKGROUND

As networks become popular, commodities are recommended and presented in an increasingly intelligent and efficient manner particularly in the field of electronic commerce. In current electronic commerce recommendation, articles are recommended by widely using history information, behavior characteristics, and identity information of users. In addition, there are also a large number of recommendations based on social networks of users.

However, interests and requirements of users may change over time, and therefore, it is usually inaccurate to make a recommendation by using only history information. In recommendation based on statistics of identity information, only requirements of a massive crowd having similarities can be described, and it is difficult to provide an individualized service. As a result, a success rate of recommendations of a seller is not high, and a user also finds it difficult to satisfy interests of the user.

SUMMARY

Embodiments of the disclosure provide a method for presenting an object based on a biometric feature, a method for recommending an object based on a biometric feature, an apparatus for presenting an object based on a biometric feature, and an apparatus for recommending an object based on a biometric feature, so that an object is presented and recommended more intelligently and accurately.

According to a first aspect, an embodiment of the disclosure provides a method for presenting an object based on a biometric feature, where the method includes obtaining information about a first object that a user is gazing at, and biometric feature information of the user gazing at the first object; recognizing a satisfaction status for the obtained biometric feature information of the user gazing at the first object; and determining and presenting information about a second object based on the recognition of the satisfaction status for the biometric feature information of the user gazing at the first object.

In a first implementation manner of the first aspect, the biometric feature information includes an electroencephalogram signal; and the recognizing a satisfaction status for the obtained biometric feature information of the user gazing at the first object includes recognizing and calculating a focus time of the user by using the biometric feature information; and if the focus time is longer than a first preset time threshold, recognizing the satisfaction status to be that the user is satisfied with the first object that the user is gazing at; or if the focus time is shorter than a second preset time threshold, recognizing the satisfaction status to be that the user is not satisfied with the first object that the user is gazing at.

With reference to the first aspect or the first implementation manner of the first aspect, in a second implementation manner of the first aspect, the biometric feature information includes electroencephalogram information; and recognizing the satisfaction status for the obtained biometric feature information of the user gazing at the first object includes recognizing a mood of the user by using the biometric feature information; and if it is recognized that the mood of the user is excited, recognizing the satisfaction status to be that the user is satisfied with the first object that the user is gazing at; or if it is recognized that the mood of the user is not excited, recognizing the satisfaction status to be that the user is not satisfied with the first object that the user is gazing at.

With reference to the first aspect or any one of the implementation manners of the first aspect, in a third implementation manner of the first aspect, the biometric feature information includes one or more information of heart rate information, blood oxygen information, blood pressure information, or pulse information; and recognizing a satisfaction status for the obtained biometric feature information of the user gazing at the first object includes, if the biometric feature information is greater than a third preset threshold, recognizing the satisfaction status to be that the user is satisfied with the first object that the user is gazing at; or if the biometric feature information is less than a fourth preset threshold, recognizing the satisfaction status to be that the user is not satisfied with the first object that the user is gazing at.

With reference to the first aspect or any one of the implementation manners of the first aspect, in a fourth implementation manner of the first aspect, determining and presenting information about a second object based on the recognition of the satisfaction status for the biometric feature information of the user gazing at the first object includes, if it is recognized that the satisfaction status indicates that the user is not satisfied with the first object that the user is gazing at, searching an object database for the second object different from the first object, and presenting the information about the second object.

With reference to the first aspect or any one of the implementation manners of the first aspect, in a fifth implementation manner of the first aspect, determining and presenting information about a second object based on the recognition of the satisfaction status for the biometric feature information of the user gazing at the first object includes, if it is recognized that the satisfaction status indicates that the user is satisfied with the first object that the user is gazing at, using more related information of the first object as the information about the second object, and presenting the information about the second object.

With reference to the first aspect or any one of the implementation manners of the first aspect, in a sixth implementation manner of the first aspect, if the first object is article information, information about the first object includes at least one information of a price, a picture, a sales volume, or a comment of the first object, and the more related information of the first object includes any other information of the price, the picture, the sales volume, or the comment of the first object except the information about the first object; and the using more related information of the first object as the information about the second object, and presenting related information of the information about the second object includes presenting the any other information of the price, the picture, the sales volume, or the comment of the first object except the information about the first object.

With reference to the first aspect or any one of the implementation manners of the first aspect, in a seventh implementation manner of the first aspect, if the first object is clothing, the more related information of the first object includes a picture of an effect of the user trying on the clothing; and the using more related information of the first object as the information about the second object, and presenting related information of the information about the second object includes presenting the picture of an effect of the user trying on the clothing.

With reference to the first aspect or any one of the implementation manners of the first aspect, in an eighth implementation manner of the first aspect, after recognizing a satisfaction status for the obtained biometric feature information of the user gazing at the first object, the method further includes recording the information about the first object that the user is satisfied with; and if an object whose type is the same as that of the focus object is included within sight of the user, pushing related information of the object whose type is the same to the user.

With reference to the first aspect or any one of the implementation manners of the first aspect, in a ninth implementation manner of the first aspect, the biometric feature information includes the electroencephalogram information, where the electroencephalogram information is a time domain signal of the electroencephalogram signal; and the recognizing a satisfaction status for the obtained biometric feature information of the user gazing at the first object includes performing frequency domain conversion on the time domain signal of the biometric feature information to obtain a frequency domain signal; and performing the recognition of the satisfaction status by using an amplitude and a frequency change of the frequency domain signal.

With reference to the first aspect or any one of the implementation manners of the first aspect, in a tenth implementation manner of the first aspect, the recognizing a satisfaction status for the obtained biometric feature information of the user gazing at the first object includes performing the recognition of the satisfaction status by comparing the biometric feature information with a satisfaction signal sample, where the biometric feature satisfaction signal sample is generated in advance.

According to a second aspect, an embodiment of the disclosure provides a method for presenting an object based on a biometric feature, where the method includes obtaining information about a first object that a user is gazing at, and biometric feature information of the user gazing at the first object, to recognize a satisfaction status for the obtained biometric feature information of the user gazing at the first object; and determining and presenting information about a second object based on the recognition of the satisfaction status for the biometric feature information of the user gazing at the first object.

According to a third aspect, an embodiment of the disclosure provides an apparatus for presenting an object based on a biometric feature, where the apparatus includes an information obtaining module, a satisfaction status recognition module, and a presentation module, where the information obtaining module is configured to obtain information about a first object that a user is gazing at, and biometric feature information of the user gazing at the first object; the satisfaction status recognition module is configured to recognize a satisfaction status for the obtained biometric feature information of the user gazing at the first object; and the presentation module is configured to determine and present information about a second object based on the recognition of the satisfaction status for the biometric feature information of the user gazing at the first object.

In a first implementation manner of the third aspect, the biometric feature information includes an electroencephalogram signal; and the satisfaction status recognition module is configured to recognize and calculate a focus time of the user by using the biometric feature information; and if the focus time is longer than a first preset time threshold, recognize the satisfaction status to be that the user is satisfied with the first object that the user is gazing at; or if the focus time is shorter than a second preset time threshold, recognize the satisfaction status to be that the user is not satisfied with the first object that the user is gazing at.

With reference to the third aspect or the first implementation manner of the third aspect, in a second implementation manner of the third aspect, the biometric feature information includes electroencephalogram information; and the satisfaction status recognition module is configured to recognize a mood of the user by using the biometric feature information; and if it is recognized that the mood of the user is excited, recognize the satisfaction status to be that the user is satisfied with the first object that the user is gazing at; or otherwise, recognize the satisfaction status to be that the user is not satisfied with the first object that the user is gazing at.

With reference to the third aspect or the first implementation manner of the third aspect, in a third implementation manner of the third aspect, the biometric feature information includes one or more information of heart rate information, blood oxygen information, blood pressure information, or pulse information; and the satisfaction status recognition module is configured to compare the biometric feature information with a third preset threshold; and if the biometric feature information exceeds the third preset threshold, recognize the satisfaction status to be that the user is satisfied with the first object that the user is gazing at; or otherwise, recognize the satisfaction status to be that the user is not satisfied with the first object that the user is gazing at.

With reference to the third aspect or the first implementation manner of the third aspect, in a fourth implementation manner of the third aspect, the presentation module is specifically configured to, if it is recognized that the satisfaction status indicates that the user is not satisfied with the first object that the user is gazing at, search an object database for the second object different from the first object, and present the information about the second object.

With reference to the third aspect or the first implementation manner of the third aspect, in a fifth implementation manner of the third aspect, the presentation module is specifically configured to, if it is recognized that the satisfaction status indicates that the user is satisfied with the first object that the user is gazing at, use more related information of the first object as the information about the second object; and present the information about the second object.

With reference to the third aspect or the first implementation manner of the third aspect, in a sixth implementation manner of the third aspect, if the first object is article information, the information about the first object includes at least one information of a price, a picture, a sales volume, or a comment of the first object, and the more related information of the first object includes any other information of the price, the picture, the sales volume, or the comment of the first object except the information about the first object; and the presentation module is specifically configured to present the any other information of the price, the picture, the sales volume, or the comment of the first object except the information about the first object.

With reference to the third aspect or the first implementation manner of the third aspect, in a seventh implementation manner of the third aspect, if the first object is clothing, the more related information of the first object includes a picture of an effect of the user trying on the clothing; and the presentation module is specifically configured to present the picture of an effect of the user trying on the clothing.

With reference to the third aspect or the first implementation manner of the third aspect, in an eighth implementation manner of the third aspect, the apparatus further includes a recording module; after the satisfaction status recognition module is configured to recognize a satisfaction status for the obtained biometric feature information of the user gazing at the first object, the recording module is configured to record the information about the first object that the user is satisfied with; and if an object whose type is the same as that of the focus object is included within sight of the user, the presentation module is further configured to push related information of the object whose type is the same to the user.

With reference to the third aspect or the first implementation manner of the third aspect, in a ninth implementation manner of the third aspect, the biometric feature information includes the electroencephalogram information, where the electroencephalogram information is a time domain signal of the electroencephalogram signal; and the satisfaction status recognition module is configured to perform frequency domain conversion on the time domain signal of the biometric feature information to obtain a frequency domain signal, and perform the recognition of the satisfaction status by using an amplitude and a frequency change of the frequency domain signal.

With reference to the third aspect or the first implementation manner of the third aspect, in a tenth implementation manner of the third aspect, the satisfaction status recognition module is configured to perform the recognition of the satisfaction status by comparing the biometric feature information with a satisfaction signal sample, where the biometric feature satisfaction signal sample is generated in advance.

According to a fourth aspect, an embodiment of the disclosure provides an apparatus for presenting an object based on a biometric feature, where the apparatus includes an information obtaining module and a presentation module, where the information obtaining module is configured to obtain information about a first object that a user is gazing at, and biometric feature information of the user gazing at the first object, to recognize a satisfaction status for the obtained biometric feature information of the user gazing at the first object; and the presentation module is configured to determine and present information about a second object based on the recognition of the satisfaction status for the biometric feature information of the user gazing at the first object.

According to a fifth aspect, an embodiment of the disclosure provides a method for recommending an object based on a biometric feature, where the method includes obtaining information about a first object that a user is gazing at, and first biometric feature information of the user gazing at the first object; obtaining information about a second object that the user is gazing at, and second biometric feature information of the user gazing at the second object; separately recognizing a satisfaction degree for the obtained biometric feature information, where the biometric feature information includes the first biometric feature information and the second biometric feature information; and selecting biometric feature information having a maximum satisfaction degree from the biometric feature information, and recommending an object corresponding to the biometric feature information having the maximum satisfaction degree.

With reference to the fifth aspect, in a first implementation manner of the fifth aspect, before the separately recognizing a satisfaction degree for the obtained biometric feature information, the method further includes obtaining information about a third object that the user is gazing at, and third biometric feature information of the user gazing at the third object; and the separately recognizing a satisfaction degree for the obtained biometric feature information includes separately recognizing a satisfaction degree for the obtained first biometric feature information, the obtained second biometric feature information, and the obtained third biometric feature information.

With reference to the fifth aspect or the first implementation manner of the fifth aspect, in a second implementation manner of the third aspect, the biometric feature information includes an electroencephalogram signal; the separately recognizing a satisfaction degree for the obtained biometric feature information includes recognizing the obtained biometric feature information to separately calculate a focus time of the user; and the selecting biometric feature information having a maximum satisfaction degree from the biometric feature information, and recommending an object corresponding to the biometric feature information having the maximum satisfaction degree includes selecting biometric feature information having a longest focus time from the biometric feature information, and recommending an object corresponding to the biometric feature information having the longest focus time.

With reference to the fifth aspect or the first implementation manner of the fifth aspect, in a third implementation manner of the fifth aspect, the biometric feature information includes one or more information of heart rate information, blood oxygen information, blood pressure information, or pulse information; the recognizing a satisfaction degree for the obtained biometric feature information of the user gazing at the first object includes extracting a heart rate value, a blood oxygen value, a blood pressure value, or a pulse value of the user from the obtained biometric feature information; and the selecting biometric feature information having a maximum satisfaction degree from the biometric feature information, and recommending an object corresponding to the biometric feature information having the maximum satisfaction degree includes selecting biometric feature information having a maximum heart rate value, a maximum blood oxygen value, a maximum blood pressure value, or a maximum pulse value from the biometric feature information, and recommending the biometric feature information having the maximum value.

According to a sixth aspect, an embodiment of the disclosure provides a method for recommending an object based on a biometric feature, where the method includes obtaining information about a first object that a user is gazing at, and first biometric feature information of the user gazing at the first object, obtaining information about a second object that the user is gazing at, and second biometric feature information of the user gazing at the second object; and recommending an object corresponding to biometric feature information having a maximum satisfaction degree, where the biometric feature information having the maximum satisfaction degree is determined by separately recognizing a satisfaction degree for the obtained biometric feature information and selecting the biometric feature information having the maximum satisfaction degree, and the obtained biometric feature information includes the first biometric feature information and the second biometric feature information.

According to a seventh aspect, an embodiment of the disclosure provides an apparatus for recommending an object based on a biometric feature, where the apparatus includes an information obtaining module, a satisfaction degree recognition module, and a recommendation module, where the information obtaining module is configured to obtain information about a first object that a user is gazing at, and first biometric feature information of the user gazing at the first object, and obtain information about a second object that the user is gazing at, and second biometric feature information of the user gazing at the second object; the satisfaction degree recognition module is configured to separately recognize a satisfaction degree for the obtained biometric feature information, where the biometric feature information includes the first biometric feature information and the second biometric feature information; and the recommendation module is configured to select biometric feature information having a maximum satisfaction degree from the biometric feature information, and recommend an object corresponding to the biometric feature information having the maximum satisfaction degree.

With reference to the seventh aspect, in a first implementation manner of the seventh aspect, the information obtaining module is further configured to obtain information about a third object that the user is gazing at, and third biometric feature information of the user gazing at the third object; and the satisfaction degree recognition module is configured to separately perform the recognition of the satisfaction degree for the obtained first biometric feature information, the obtained second biometric feature information, and the obtained third biometric feature information.

With reference to the seventh aspect or the first implementation manner of the seventh aspect, in one implementation manner of the seventh aspect, the biometric feature information includes an electroencephalogram signal; the satisfaction degree recognition module is configured to recognize the obtained biometric feature information to separately calculate a focus time of the user; and the recommendation module is specifically configured to select biometric feature information having a longest focus time from the biometric feature information, and recommend an object corresponding to the biometric feature information having the longest focus time.

With reference to the seventh aspect or the first implementation manner of the seventh aspect, in one implementation manner of the seventh aspect, the biometric feature information includes one or more information of heart rate information, blood oxygen information, blood pressure information, or pulse information; the satisfaction degree recognition module is configured to extract a heart rate value, a blood oxygen value, a blood pressure value, or a pulse value of the user from the obtained biometric feature information; and the recommendation module is specifically configured to select biometric feature information having a maximum heart rate value, a maximum blood oxygen value, a maximum blood pressure value, or a maximum pulse value from the biometric feature information, and recommend the biometric feature information having the maximum value.

According to an eighth aspect, an embodiment of the disclosure provides an apparatus for recommending an object based on a biometric feature, where the apparatus includes an information obtaining module and a recommendation module, where the information obtaining module is configured to obtain information about a first object that a user is gazing at, and first biometric feature information of the user gazing at the first object, and obtain information about a second object that the user is gazing at, and second biometric feature information of the user gazing at the second object; and the recommendation module is configured to recommend an object corresponding to biometric feature information having a maximum satisfaction degree, where the biometric feature information having the maximum satisfaction degree is determined by separately recognizing a satisfaction degree for the obtained biometric feature information and selecting the biometric feature information having the maximum satisfaction degree, and the obtained biometric feature information includes the first biometric feature information and the second biometric feature information.

According to the method provided in the embodiments of the disclosure, information about a first object that a user is gazing at, and biometric feature information of the user gazing at the first object are obtained; recognition of a satisfaction status is performed on the obtained biometric feature information of the user gazing at the first object; and information about a second object is determined and presented based on the recognition of the satisfaction status for the biometric feature information of the user gazing at the first object, information about an object that a user is gazing at and biometric feature information of the user are used to automatically recognize a satisfaction degree, thereby improving intelligence and accuracy of information presentation.

DESCRIPTION OF EMBODIMENTS

Figure 1:
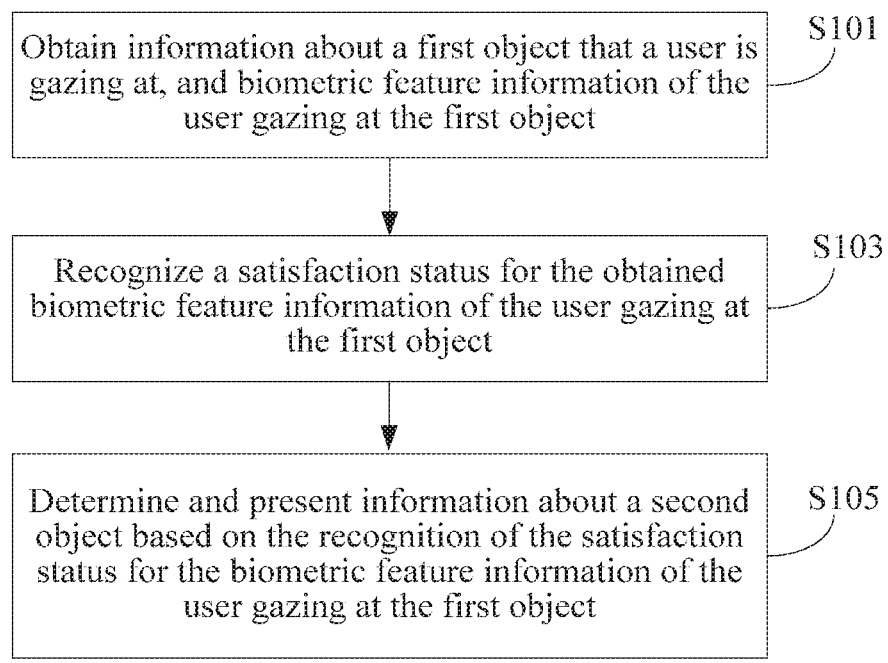
FIG. 1 is a flowchart of an embodiment of a method for presenting an object based on a biometric feature according to the disclosure.

Embodiments of the disclosure provide a method for presenting an object based on a biometric feature. As shown in FIG. 1, FIG. 1 is a flowchart of an embodiment of a method for presenting an object based on a biometric feature according to the disclosure. The method includes the following.

S101. Obtain information about a first object that a user is gazing at, and biometric feature information of the user gazing at the first object.

S103. Recognize a satisfaction status for the obtained biometric feature information of the user gazing at the first object.

S105. Determine and present information about a second object based on the recognition of the satisfaction status for the biometric feature information of the user gazing at the first object.

In this embodiment of the disclosure, the information about the first object that the user is gazing at may be obtained by capturing a gazing location of eyes of the user by using a head mounted device or wearable smart glasses of the user or another external device facing the user, where the gazing location of the eyes may be calculated by capturing a gazing direction and locations of pupils of the two eyes, or the gazing location of the eyes of the user may be calculated by combining a location of the user.

In an embodiment of the disclosure, the information about the second object may be presented on a screen of a wearable device, a computer, or a television of the user. The method provided in this embodiment of the disclosure may be implemented by means of presentation of a large advertisement screen in a shopping mall, presentation of a computer that implements remote electronic commerce, or presentation of future wearable glasses or a future head mounted device. In the method provided in this embodiment of the disclosure, an object is presented according to recognition of a satisfaction status of a user, thereby improving intelligence and automation of object presentation.

Figure 2:
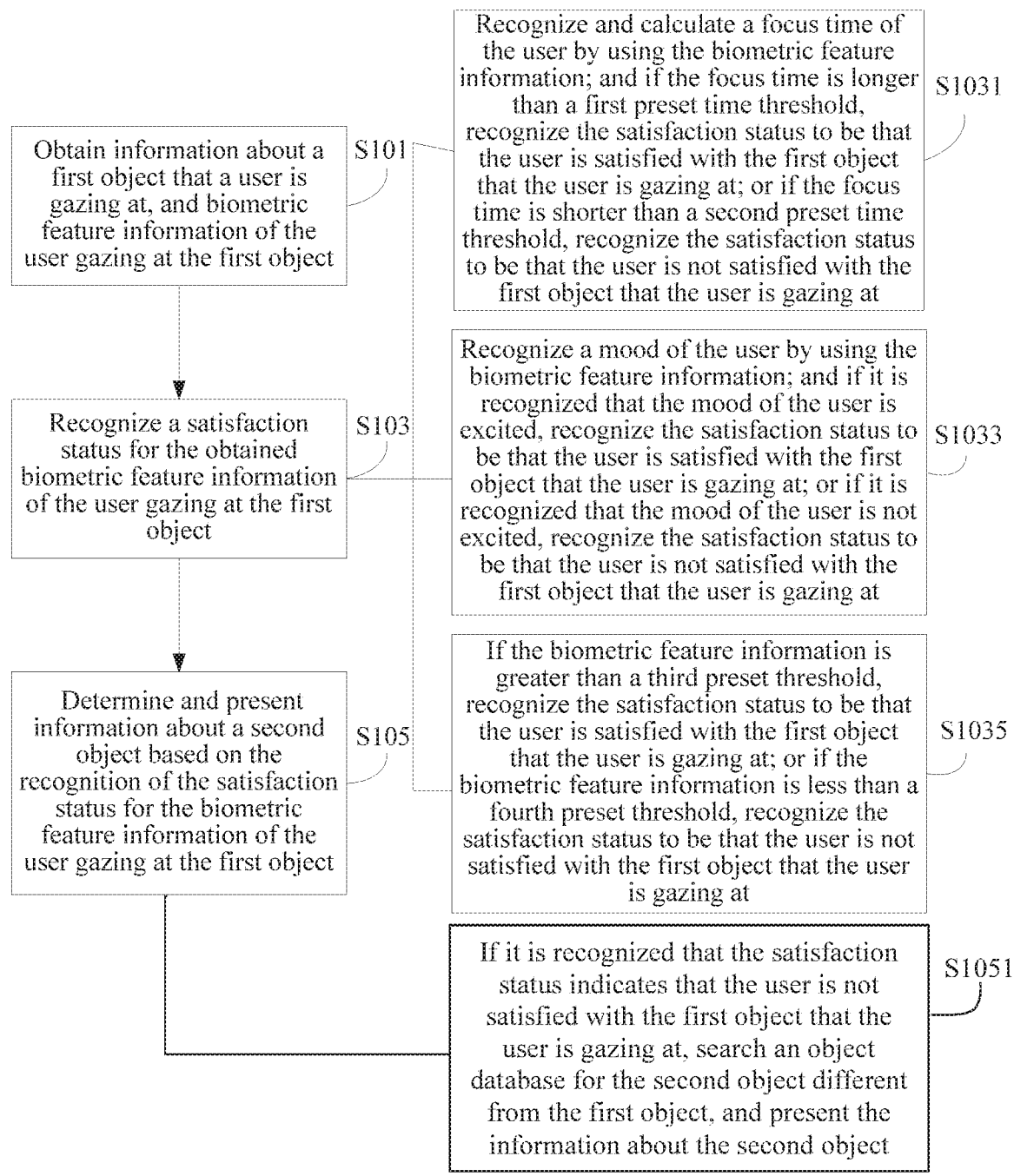
FIG. 2 is a flowchart of another embodiment of a method for presenting an object based on a biometric feature according to the disclosure.

In an embodiment of the disclosure, as shown in FIG. 2, FIG. 2 provides a flowchart of another embodiment of a method for presenting an object based on a biometric feature according to the disclosure. The biometric feature information includes an electroencephalogram signal; and recognizing a satisfaction status for the obtained biometric feature information of the user gazing at the first object includes S1031: Recognize and calculate a focus time of the user by using the biometric feature information; and if the focus time is longer than a first preset time threshold, recognize the satisfaction status to be that the user is satisfied with the first object that the user is gazing at; or if the focus time is shorter than a second preset time threshold, recognize the satisfaction status to be that the user is not satisfied with the first object that the user is gazing at.

In an embodiment of the disclosure, the electroencephalogram signal is collected by using a head mounted device or glasses. The electroencephalogram signal includes attribute information of the focus time of the user.

In an embodiment of the disclosure, the biometric feature information is an electroencephalogram signal, frequency domain conversion is performed on a time domain signal of electroencephalogram signal to obtain a frequency domain signal, and an amplitude or a frequency change of the frequency domain signal is calculated to calculate the focus time. Alternatively, an amplitude or a frequency change of the electroencephalogram signal is calculated by using a time domain signal of information of the electroencephalogram signal, to calculate the focus time. Alternatively, the electroencephalogram signal is compared with a focus signal sample to calculate relevance between the electroencephalogram signal and the focus signal sample to calculate the focus time, and the focus signal sample is generated in advance by means of training.

When a brainwave is between 12 hertz (Hz) and 30 Hz, the brainwave is a Beta wave, and it indicates that a brain is in a focused state. When a brainwave is between 8 Hz and 12 Hz, the brainwave is an Alpha wave, and it indicates that a brain is in a calm and relaxed state. In an embodiment of the disclosure, the calculating an amplitude or a frequency change of the electroencephalogram signal by using a time domain signal of information of the electroencephalogram signal, to calculate the focus time specifically includes calculating duration of a brainwave, that is, a Beta wave between 12 Hz and 30 Hz, to calculate the focus time.

In an embodiment of the disclosure, the first preset time threshold and the second preset time threshold may be the same or different.

In the method provided in this embodiment, whether the user is content or not satisfied with the first object when the user gazes at the first object can be recognized by using different corresponding focus states of the user being content or not content.

In an embodiment of the disclosure, as shown in FIG. 2, the biometric feature information includes electroencephalogram information; and the recognizing a satisfaction status for the obtained biometric feature information of the user gazing at the first object includes S1033: Recognize a mood of the user by using the biometric feature information; and if it is recognized that the mood of the user is excited, recognize the satisfaction status to be that the user is satisfied with the first object that the user is gazing at; or if it is recognized that the mood of the user is not excited, recognize the satisfaction status to be that the user is not satisfied with the first object that the user is gazing at.

In an embodiment of the disclosure, the electroencephalogram signal is compared with a satisfaction signal sample to calculate relevance between the electroencephalogram signal and the satisfaction signal sample to perform the recognition of the satisfaction status, and the satisfaction signal sample is generated in advance by means of training. Alternatively, a satisfaction signal sample and a dissatisfaction signal sample are collected to extract satisfaction recognition characteristics that distinguish a satisfaction signal and a dissatisfaction signal, and the recognition of the satisfaction status is performed on the electroencephalogram signal by using the satisfaction recognition characteristics. A recognition method in this embodiment of the disclosure is not limited to the foregoing methods.

In the method provided in this embodiment, whether the user is content or not satisfied with the first object when the user gazes at the first object can be recognized by using different information that corresponds to the electroencephalogram information of the user being content or not content.

In an embodiment of the disclosure, as shown in FIG. 2, the biometric feature information includes one or more information of heart rate information, blood oxygen information, blood pressure information, or pulse information; and the recognizing a satisfaction status for the obtained biometric feature information of the user gazing at the first object includes S1035: If the biometric feature information is greater than a third preset threshold, recognize the satisfaction status to be that the user is satisfied with the first object that the user is gazing at; or if the biometric feature information is less than a fourth preset threshold, recognize the satisfaction status to be that the user is not satisfied with the first object that the user is gazing at.

In an embodiment of the disclosure, if the biometric feature information includes multiple information of the heart rate information, the blood oxygen information, the blood pressure information, or the pulse information, the third preset threshold or the fourth preset threshold is a threshold information group consisting of the multiple information of the heart rate information, the blood oxygen information, the blood pressure information, or the pulse information. Alternatively, the biometric feature information is a weighted value of the multiple information, and the third preset threshold or the fourth preset threshold is a weighted value of the multiple information in a same manner.

In an embodiment of the disclosure, the heart rate information, the blood oxygen information, the blood pressure information, or the pulse information may be obtained by using a wearable smart band, wearable glasses, a wearable ring, or the like, and the wearable device performs the recognition of the satisfaction status after obtaining the information. Alternatively, another device having a stronger processing capability receives the biometric feature information obtained by using a wearable smart band, wearable glasses, or a wearable ring, to perform the recognition of the satisfaction status, and the another device having a stronger processing capability may implement presentation by means of a large advertisement screen in a shopping mall, a computer that implements remote electronic commerce, or future wearable glasses or a future head mounted device.

In the method provided in this embodiment, whether the user is content or not satisfied with the first object when the user gazes at the first object can be recognized by using different information that corresponds to the heart rate information, the blood oxygen information, the blood pressure information, or the pulse information of the user being content or not content.

In the method provided in this embodiment of the disclosure, recognizing a satisfaction status for the obtained biometric feature information of the user gazing at the first object includes S1031, S1033, S1035, and another method not limited to the foregoing methods, and any biometric feature that can reflect an attitude of the user gazing at the first object can be implemented by means of the recognition of the satisfaction status.

In an embodiment of the disclosure, as shown in FIG. 2, determining and presenting information about a second object based on the recognition of the satisfaction status for the biometric feature information of the user gazing at the first object includes S1051: if it is recognized that the satisfaction status indicates that the user is not satisfied with the first object that the user is gazing at, search an object database for the second object different from the first object, and present the information about the second object.

In the method provided in this embodiment of the disclosure, when the user is not satisfied with the first object, the second object different from the first object can be presented.

The method provided in this embodiment of the disclosure is applicable to advertisement recommendation of a shopping mall, and if a user is not content, another object is presented to the user. The method is also applicable to a social networking platform, and if a user is not content, another candidate to make friends with is presented to the user. In the method provided in this embodiment of the disclosure, presentation may also be implemented in combination with a virtual reality technology and an augmented reality technology.

In an embodiment of the disclosure, the searching an object database for the second object different from the first object if it is recognized that the satisfaction status indicates that the user is not satisfied with the first object that the user is gazing at specifically includes, if a biometric feature signal is recognized to indicate that the user is not satisfied with a type of the first object that the user is gazing at, searching the object database for the second object whose type is the same as that of the first object and whose price is different, and presenting the information about the second object.

In an embodiment of the disclosure, the searching an object database for the second object different from the first object if it is recognized that the satisfaction status indicates that the user is not satisfied with the first object that the user is gazing at specifically includes, if a biometric feature signal is recognized to indicate that the user is not satisfied with a type of the first object that the user is gazing at, searching the object database for the second object whose type is different from that of the first object, and presenting the information about the second object.

In an embodiment of the disclosure, the searching an object database for the second object different from the first object if it is recognized that the satisfaction status indicates that the user is not satisfied with the first object that the user is gazing at specifically includes, if a biometric feature signal is recognized to indicate that the user is not satisfied with a color of the first object that the user is gazing at, searching the object database for the second object whose color is different from that of the first object, and presenting the information about the second object.

In an embodiment of the disclosure, as shown in FIG. 2, the determining and presenting information about a second object based on the recognition of the satisfaction status for the biometric feature information of the user gazing at the first object includes S1053: If it is recognized that the satisfaction status indicates that the user is satisfied with the first object that the user is gazing at, use more related information of the first object as the information about the second object, and present the information about the second object.

In the method provided in this embodiment of the disclosure, when the user is satisfied with the first object, more related information of the first object can be presented. The method provided in this embodiment of the disclosure is applicable to advertisement recommendation in a shopping mall, and if a user is content, more detailed information of an object that the user focuses on is presented to the user. The method is also applicable to a social networking platform, and if a user is content, more detailed information of an object that the user focuses on is presented to the user.

In an embodiment of the disclosure, if the first object is article information, the information about the first object includes at least one information of a price, a picture, a sales volume, or a comment of the first object, and the more related information of the first object includes any other information of the price, the picture, the sales volume, or the comment of the first object except the information about the first object; and the using more related information of the first object as the information about the second object, and presenting related information of the information about the second object includes presenting the any other information of the price, the picture, the sales volume, or the comment of the first object except the information about the first object.

In this embodiment of the disclosure, the information about the first object is rough information about the first object, and the information about the second object is more detailed information about the first object. For example, the information about the first object is picture information of the first object, and when a user is content, the presented information about the second object is more detailed related information such as a price, a sales volume, or a comment of the first object.

In an embodiment of the disclosure, if the first object is clothing, the more related information of the first object includes a picture of an effect of the user trying on the clothing; and the using more related information of the first object as the information about the second object, and presenting related information of the information about the second object includes presenting the picture of an effect of the user trying on the clothing.

In this embodiment of the disclosure, the information about the first object is rough information about the first object. For example, the information about the first object is picture information of the first object, and when a user is content, the presented information about the second object is the picture of an effect of the user trying on the clothing. The information about the first object and the information about the second object are not limited to the descriptions in the foregoing embodiments.

Figure 3:
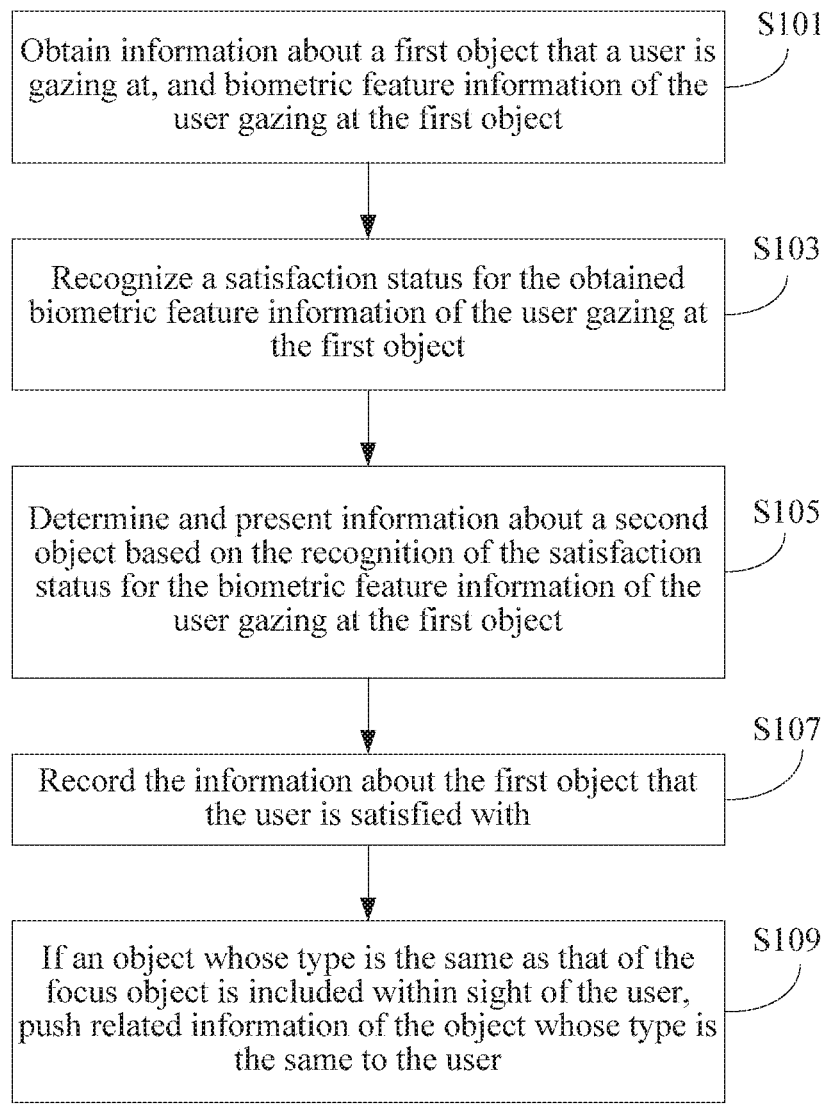
FIG. 3 is a flowchart of still another embodiment of a method for presenting an object based on a biometric feature according to the disclosure.

In an embodiment of the disclosure, as shown in FIG. 3, FIG. 3 is a flowchart of an embodiment of a method for presenting an object based on a biometric feature according to the disclosure. After recognizing a satisfaction status for the obtained biometric feature information of the user gazing at the first object in S103, the method further includes the following.

S107. Record the information about the first object that the user is satisfied with.

S109. If an object whose type is the same as that of the focus object is included within sight of the user, push related information of the object whose type is the same to the user. In an embodiment of the disclosure, S107 and S109 are performed before or after step S105 or S107, S109, and S105 are performed simultaneously.

In the method in this embodiment of the disclosure, the biometric feature information is collected to recommend an object, and is more intelligent and accurate than existing object recommendation that is based on history information and user recognition.

In an embodiment of the disclosure, the biometric feature information includes the electroencephalogram information, where the electroencephalogram information is a time domain signal of the electroencephalogram signal; and the recognizing a satisfaction status for the obtained biometric feature information of the user gazing at the first object includes performing frequency domain conversion on the time domain signal of the biometric feature information to obtain a frequency domain signal; and performing the recognition of the satisfaction status by using an amplitude and a frequency change of the frequency domain signal.

In an embodiment of the disclosure, the recognizing a satisfaction status for the obtained biometric feature information of the user gazing at the first object includes comparing the biometric feature information with a satisfaction signal sample to calculate relevance between the biometric feature information and the satisfaction signal sample to perform the recognition of the satisfaction status, where the biometric feature satisfaction signal sample is generated in advance by means of training. If the biometric feature information is the electroencephalogram information, the electroencephalogram information is a time domain signal of the electroencephalogram signal, and the satisfaction signal sample is also a time domain signal of the electroencephalogram signal; and the electroencephalogram information is compared with the satisfaction signal sample to calculate relevance between the electroencephalogram information and the satisfaction signal sample to perform the recognition of the satisfaction status. If the biometric feature information is heart rate information, blood oxygen information, blood pressure information, or pulse information, the satisfaction signal sample is a satisfaction threshold signal of heart rate information, blood oxygen information, blood pressure information, or pulse information; and the comparing the biometric feature information with a satisfaction signal sample includes comparing the biometric feature information with the satisfaction threshold signal, to perform the recognition of the satisfaction status.

Figure 4:
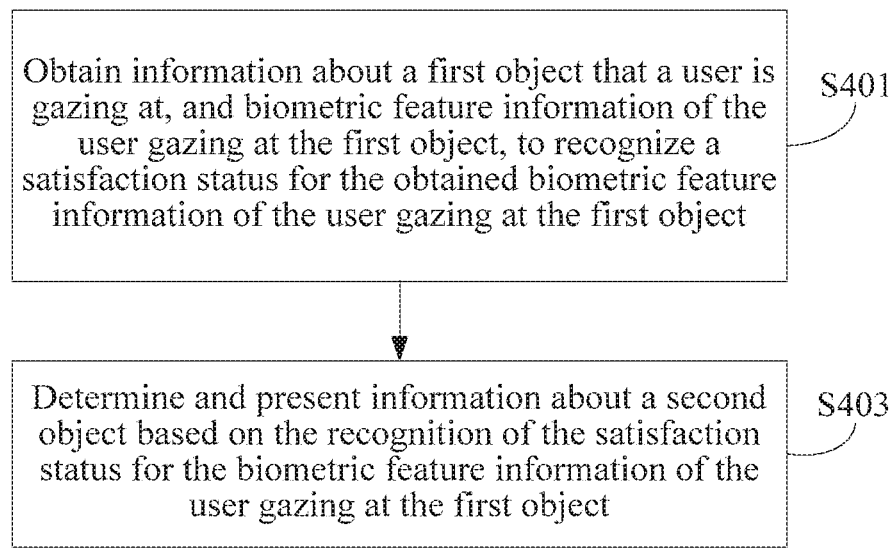
FIG. 4 is a flowchart of yet another embodiment of a method for presenting an object based on a biometric feature according to the disclosure.

An embodiment of the disclosure provides a method for presenting an object based on a biometric feature. As shown in FIG. 4, FIG. 4 is a flowchart of an embodiment of a method for presenting an object based on a biometric feature according to the disclosure. The method includes the following.

S401. Obtain information about a first object that a user is gazing at, and biometric feature information of the user gazing at the first object, to recognize a satisfaction status for the obtained biometric feature information of the user gazing at the first object.

S403. Determine and present information about a second object based on the recognition of the satisfaction status for the biometric feature information of the user gazing at the first object.

In this embodiment of the disclosure, the information about the first object that the user is gazing at may be obtained by capturing a gazing location of eyes of the user by using a head mounted device or wearable smart glasses of the user or another external device facing the user, where the gazing location of the eyes may be calculated by capturing a gazing direction and locations of pupils of the two eyes, or the gazing location of the eyes of the user may be calculated by combining a location of the user. In an embodiment of the disclosure, the information about the second object may be presented on a screen of a wearable device, a computer, or a television of the user.

After obtaining information about a first object that a user is gazing at, and biometric feature information of the user gazing at the first object in step S401, the method further includes sending the obtained information to another processing device that has a stronger processing function and that is in communication connection a device that performs step S401, to perform the recognition of the satisfaction status. Before step S403, the method further includes receiving a result of the recognition of the satisfaction status.

In an embodiment of the disclosure, determining and presenting information about a second object based on the recognition of the satisfaction status for the biometric feature information of the user gazing at the first object in S403 includes, if it is recognized that the satisfaction status indicates that the user is not satisfied with the first object that the user is gazing at, searching an object database for the second object different from the first object, and present the information about the second object.

In the method provided in this embodiment of the disclosure, when the user is not satisfied with the first object, the second object different from the first object can be presented. The method provided in this embodiment of the disclosure is applicable to advertisement recommendation of a shopping mall, and if a user is not content, another object is presented to the user. The method is also applicable to a social networking platform, and if a user is not content, another candidate to make friends with is presented to the user. In the method provided in this embodiment of the disclosure, presentation may also be implemented in combination with a virtual reality technology and an augmented reality technology.

In an embodiment of the disclosure, determining and presenting information about a second object based on the recognition of the satisfaction status for the biometric feature information of the user gazing at the first object in S403 includes, if it is recognized that the satisfaction status indicates that the user is satisfied with the first object that the user is gazing at, use more related information of the first object as the information about the second object, and present the information about the second object.

In the method provided in this embodiment of the disclosure, when the user is satisfied with the first object, more related information of the first object can be presented. The method provided in this embodiment of the disclosure is applicable to advertisement recommendation in a shopping mall, and if a user is content, more detailed information of an object that the user focuses on is presented to the user. The method is also applicable to a social networking platform, and if a user is content, more detailed information of an object that the user focuses on is presented to the user.

Figure 5:
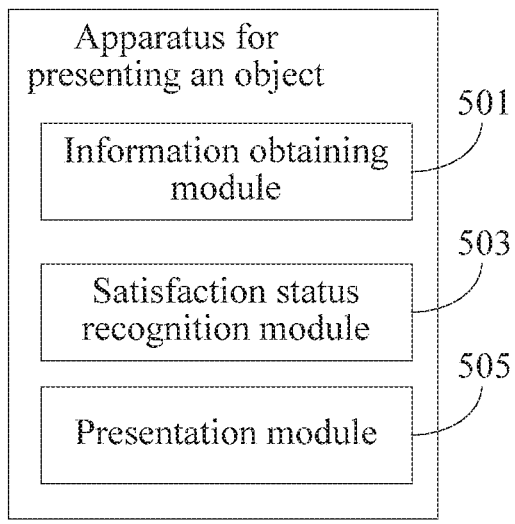
FIG. 5 is a structural diagram of an embodiment of an apparatus for presenting an object based on a biometric feature according to the disclosure.

An embodiment of the disclosure provides an apparatus for presenting an object based on a biometric feature. As shown in FIG. 5, FIG. 5 is a structural diagram of an embodiment of an apparatus for presenting an object based on a biometric feature according to the disclosure. The apparatus includes an information obtaining module 501, a satisfaction status recognition module 503, and a presentation module 505. The information obtaining module 501 is configured to obtain information about a first object that a user is gazing at, and biometric feature information of the user gazing at the first object. The satisfaction status recognition module 503 is configured to recognize a satisfaction status for the obtained biometric feature information of the user gazing at the first object. The presentation module 505 is configured to determine and present information about a second object based on the recognition of the satisfaction status for the biometric feature information of the user gazing at the first object.

The apparatus in this embodiment of the disclosure may be a head mounted device or wearable smart glasses of the user or another external device facing the user. The apparatus provided in this embodiment of the disclosure presents an object according to recognition of a satisfaction status of a user, thereby improving intelligence and automation of object presentation.

In an embodiment of the disclosure, the biometric feature information includes an electroencephalogram signal; and the satisfaction status recognition module 503 is configured to recognize and calculate a focus time of the user by using the biometric feature information; and if the focus time is longer than a first preset time threshold, recognize the satisfaction status to be that the user is satisfied with the first object that the user is gazing at; or if the focus time is shorter than a second preset time threshold, recognize the satisfaction status to be that the user is not satisfied with the first object that the user is gazing at.

In an embodiment of the disclosure, the biometric feature information includes electroencephalogram information; and the satisfaction status recognition module 503 is configured to recognize a mood of the user by using the biometric feature information; and if it is recognized that the mood of the user is excited, recognize the satisfaction status to be that the user is satisfied with the first object that the user is gazing at; or otherwise, recognize the satisfaction status to be that the user is not satisfied with the first object that the user is gazing at.

In an embodiment of the disclosure, the biometric feature information includes one or more information of heart rate information, blood oxygen information, blood pressure information, or pulse information; and the satisfaction status recognition module 503 is configured to compare the biometric feature information with a third preset threshold; and if the biometric feature information exceeds the third preset threshold, recognize the satisfaction status to be that the user is satisfied with the first object that the user is gazing at; or otherwise, recognize the satisfaction status to be that the user is not satisfied with the first object that the user is gazing at.

In an embodiment of the disclosure, the presentation module is specifically configured to, if it is recognized that the satisfaction status indicates that the user is not satisfied with the first object that the user is gazing at, search an object database for the second object different from the first object; and present the information about the second object.

In an embodiment of the disclosure, the presentation module is specifically configured to, if it is recognized that the satisfaction status indicates that the user is satisfied with the first object that the user is gazing at, use more related information of the first object as the information about the second object; and present the information about the second object.

In an embodiment of the disclosure, if the first object is article information, the information about the first object includes at least one information of a price, a picture, a sales volume, or a comment of the first object; and the more related information of the first object includes any other information of the price, the picture, the sales volume, or the comment of the first object except the information about the first object; and the presentation module is specifically configured to present the any other information of the price, the picture, the sales volume, or the comment of the first object except the information about the first object.

In an embodiment of the disclosure, if the first object is clothing, the more related information of the first object includes a picture of an effect of the user trying on the clothing; and the presentation module is specifically configured to present the picture of an effect of the user trying on the clothing.

Figure 6:
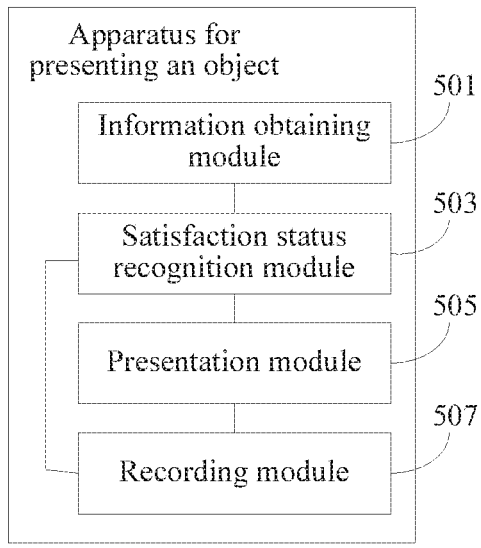
FIG. 6 is a structural diagram of another embodiment of an apparatus for presenting an object based on a biometric feature according to the disclosure.
Figure 7A:
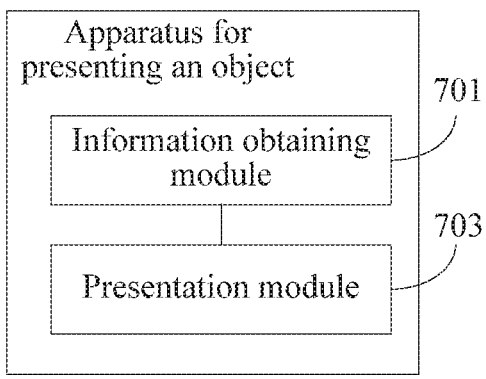
FIG. 7A and FIG. 7B are structural diagrams of embodiments of an apparatus for presenting an object based on a biometric feature according to the disclosure.
Figure 7B:
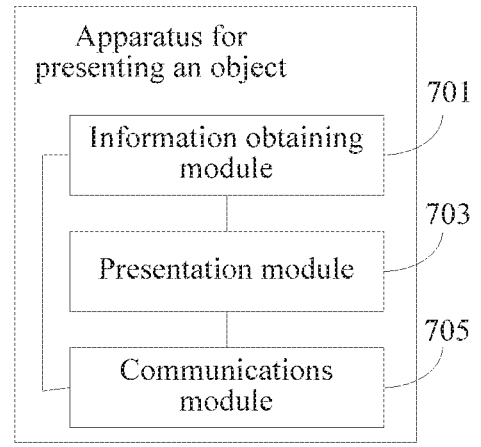

In an embodiment of the disclosure, as shown in FIG. 6, FIG. 6 is a structural diagram of an embodiment of an apparatus for presenting an object based on a biometric feature according to the disclosure. The apparatus further includes a recording module 507. After the presentation module 505 determines and presents the information about the second object, the recording module 507 is configured to record the information about the first object that the user is satisfied with. If an object whose type is the same as that of the focus object is included within sight of the user, the presentation module 505 is further configured to push related information of the object whose type is the same to the user.

In an embodiment of the disclosure, the biometric feature information includes the electroencephalogram information, where the electroencephalogram information is a time domain signal of the electroencephalogram signal; and the satisfaction status recognition module 503 is configured to perform frequency domain conversion on the time domain signal of the biometric feature information to obtain a frequency domain signal, and perform the recognition of the satisfaction status by using an amplitude and a frequency change of the frequency domain signal.

In an embodiment of the disclosure, the satisfaction status recognition module 503 is configured to perform the recognition of the satisfaction status by comparing the biometric feature information with a satisfaction signal sample, where the biometric feature satisfaction signal sample is generated in advance.

An embodiment of the disclosure provides an apparatus for presenting an object based on a biometric feature. As shown in FIG. (7A), FIG. (7A) is a structural diagram of an embodiment of an apparatus for presenting an object based on a biometric feature. The apparatus includes an information obtaining module 701 and a presentation module 703. The information obtaining module 703 is configured to obtain information about a first object that a user is gazing at, and biometric feature information of the user gazing at the first object, to recognize a satisfaction status for the obtained biometric feature information of the user gazing at the first object. The presentation module 703 is configured to determine and present information about a second object based on the recognition of the satisfaction status for the biometric feature information of the user gazing at the first object.

In this embodiment of the disclosure, the apparatus is a head mounted device or wearable smart glasses of the user or another external device facing the user. The information about the first object that the user is gazing at may be obtained by capturing a gazing location of eyes of the user by using a head mounted device or wearable smart glasses of the user or another external device facing the user, where the gazing location of the eyes may be calculated by capturing a gazing direction and locations of pupils of the two eyes, or the gazing location of the eyes of the user may be calculated by combining a location of the user. In an embodiment of the disclosure, the information about the second object may be presented on a screen of a wearable device, a computer, or a television of the user.

In an embodiment of the disclosure, as shown in FIG. (7B), the apparatus further includes a communications module 705. After the information obtaining module 701 obtains the information about the first object that the user is gazing at, and the biometric feature information of the user gazing at the first object, the communications module is configured to send the obtained information to another processing device that has a stronger processing function and that is connected to the information obtaining module 701, to perform the recognition of the satisfaction status. The communications module is further configured to receive a result of the recognition of the satisfaction status, so that the presentation module 703 determines and presents the information about the second object.

Figure 8:
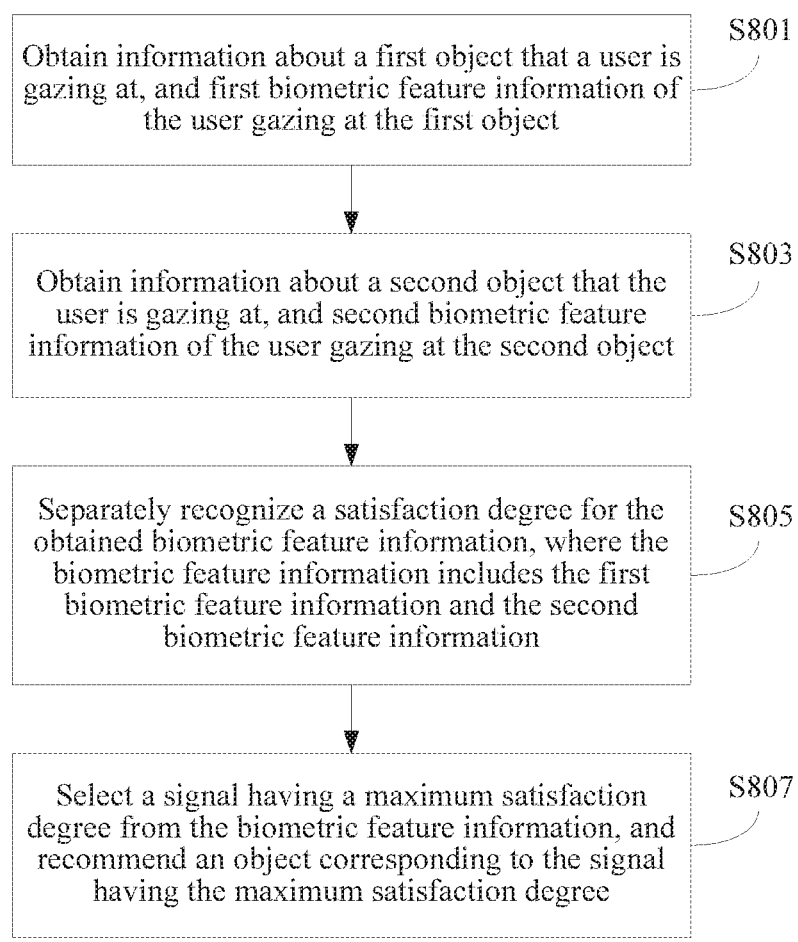
FIG. 8 is a flowchart of an embodiment of a method for presenting an object based on a biometric feature according to the disclosure.

An embodiment of the disclosure provides a method for recommending an object based on a biometric feature. As shown in FIG. 8, FIG. 8 is a flowchart of an embodiment of a method for presenting an object based on a biometric feature according to the disclosure. The method includes the following.

S801: Obtain information about a first object that a user is gazing at, and first biometric feature information of the user gazing at the first object.

S803: Obtain information about a second object that the user is gazing at, and second biometric feature information of the user gazing at the second object.

S805: Separately recognize a satisfaction degree for the obtained biometric feature information, where the biometric feature information includes the first biometric feature information and the second biometric feature information.

S807: Select a signal having a maximum satisfaction degree from the biometric feature information, and recommend an object corresponding to the signal having the maximum satisfaction degree.

In this embodiment of the disclosure, the information about the first object that the user is gazing at or the information about the second object that the user is gazing at may be obtained by capturing a gazing location of eyes of the user by using a head mounted device or wearable smart glasses of the user or another external device facing the user, where the gazing location of the eyes may be calculated by capturing a gazing direction and locations of pupils of the two eyes, or the gazing location of the eyes of the user may be calculated by combining a location of the user.

In an embodiment of the disclosure, the recommended object corresponding to the signal having the maximum satisfaction degree may be presented by using a wearable device, a computer, or a screen of a television of the user, or is presented by means of a speech function of a wearable device, a computer, or a television of the user. In the method provided in this embodiment of the disclosure, recommendation may be implemented by means of a large advertisement screen in a shopping mall, a computer that implements remote electronic commerce, or future wearable glasses or a future head mounted device.

In the method provided in this embodiment of the disclosure, recognition of a satisfaction degree is separately performed on the obtained biometric feature information, a signal having a maximum satisfaction degree can be selected from the biometric feature information by using information about a satisfaction degree for an object that the user gazes at, and a commodity corresponding to the signal having the maximum satisfaction degree of the user can be recorded. The object corresponding to the signal having the maximum satisfaction degree is recommended, and object recommendation is implemented according to the recognition of the satisfaction degree of the user. Therefore, a suggestion may be provided when the user has difficulty in selecting an object, and in addition, more accurate information of a satisfaction status may be provided based on the biometric feature information of the user, thereby improving accuracy of recommendation and suggestion.

The method provided in this embodiment of the disclosure is applicable to commodity recommendation in a shopping mall, and is also applicable to a social networking platform to recommend a candidate to make friends with.

In an embodiment of the disclosure, before separately recognizing a satisfaction degree for the obtained biometric feature information in S805, the method further includes S804: Obtain information about a third object that the user is gazing at, and third biometric feature information of the user gazing at the third object. Separately recognizing a satisfaction degree for the obtained biometric feature information includes separately recognizing a satisfaction degree for the obtained first biometric feature information, the obtained second biometric feature information, and the obtained third biometric feature information.

In an embodiment of the disclosure, the biometric feature information is not limited to the first object, the second object, and the third object, and may further include any quantity of objects.

Figure 9:
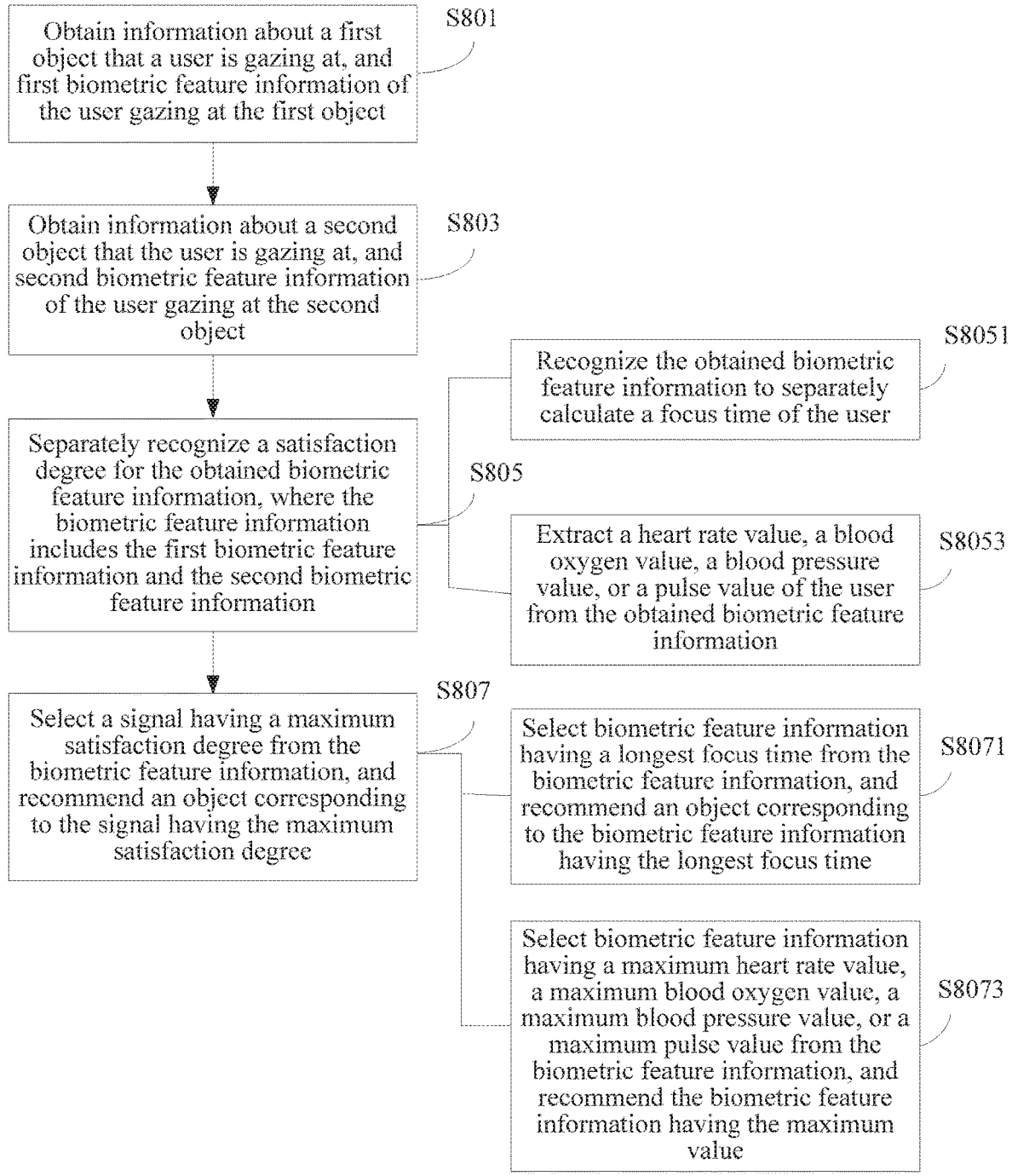
FIG. 9 is a flowchart of another embodiment of a method for presenting an object based on a biometric feature according to the disclosure.

In an embodiment of the disclosure, as shown in FIG. 9, FIG. 9 is a flowchart of an embodiment of the disclosure. The biometric feature information includes an electroencephalogram signal. Separately recognizing a satisfaction degree for the obtained biometric feature information in S805 includes S8051: Recognize the obtained biometric feature information to separately calculate a focus time of the user. Selecting biometric feature information having a maximum satisfaction degree from the biometric feature information, and recommending an object corresponding to the biometric feature information having the maximum satisfaction degree in S807 includes S8071: Select biometric feature information having a longest focus time from the biometric feature information, and recommend an object corresponding to the biometric feature information having the longest focus time.

In an embodiment of the disclosure, the electroencephalogram signal is collected by using a head mounted device or glasses. The electroencephalogram signal includes attribute information of the focus time of the user.

In an embodiment of the disclosure, the biometric feature information is an electroencephalogram signal, frequency domain conversion is performed on a time domain signal of information of the electroencephalogram signal to obtain a frequency domain signal, and an amplitude or a frequency change of the frequency domain signal is calculated to calculate the focus time. Alternatively, an amplitude or a frequency change of the electroencephalogram signal is calculated by using a time domain signal of information of the electroencephalogram signal, to calculate the focus time. Alternatively, the electroencephalogram signal is compared with a focus signal sample to calculate relevance between the electroencephalogram signal and the focus signal sample to calculate the focus time, and the focus signal sample is generated in advance by means of training.

In an embodiment of the disclosure, gazing behavior information is collected by using a head mounted device, glasses, or a device facing eyes of the user. The gazing behavior information includes attribute information of a focus time of the user. The information about the first object that the user is gazing at and the information about the second object that the user is gazing at are obtained by capturing a gazing location of eyes of the user, and the gazing location of the eyes may be calculated by capturing a gazing direction and locations of pupils of the two eyes. A time within which the user gazes at the first object and a time within which the user gazes at the second object are calculated based on changes of the gazing locations of the eyes.

In an embodiment of the disclosure, as shown in FIG. 9, the biometric feature information includes one or more information of heart rate information, blood oxygen information, blood pressure information, or pulse information. The recognizing a satisfaction degree for the obtained biometric feature information of the user gazing at the first object in S805 includes S8053: Extract a heart rate value, a blood oxygen value, a blood pressure value, or a pulse value of the user from the obtained biometric feature information. Selecting biometric feature information having a maximum satisfaction degree from the biometric feature information, and recommending an object corresponding to the biometric feature information having the maximum satisfaction degree in S807 includes S8073: Select biometric feature information having a maximum heart rate value, a maximum blood oxygen value, a maximum blood pressure value, or a maximum pulse value from the biometric feature information, and recommend the biometric feature information having the maximum value.

In an embodiment of the disclosure, the heart rate value, the blood oxygen value, the blood pressure value, and the pulse value are a quantity of contractions per unit time of a heart rate, a concentration of oxygen in blood, a value of a blood pressure, and a quantity of pulses per unit time respectively.

In an embodiment of the disclosure, the heart rate information, the blood oxygen information, the blood pressure information, or the pulse information may be obtained by using a wearable smart band, wearable glasses, a wearable ring, or the like, and the wearable device recognizes a satisfaction degree after obtaining the information. Alternatively, another device having a stronger processing capability receives the biometric feature information obtained by using a wearable smart band, wearable glasses, or a wearable ring, to recognize a satisfaction degree, and the another device having a stronger processing capability may implement presentation by means of a large advertisement screen in a shopping mall, a computer that implements remote electronic commerce, or future wearable glasses or a future head mounted device.

Figure 10:
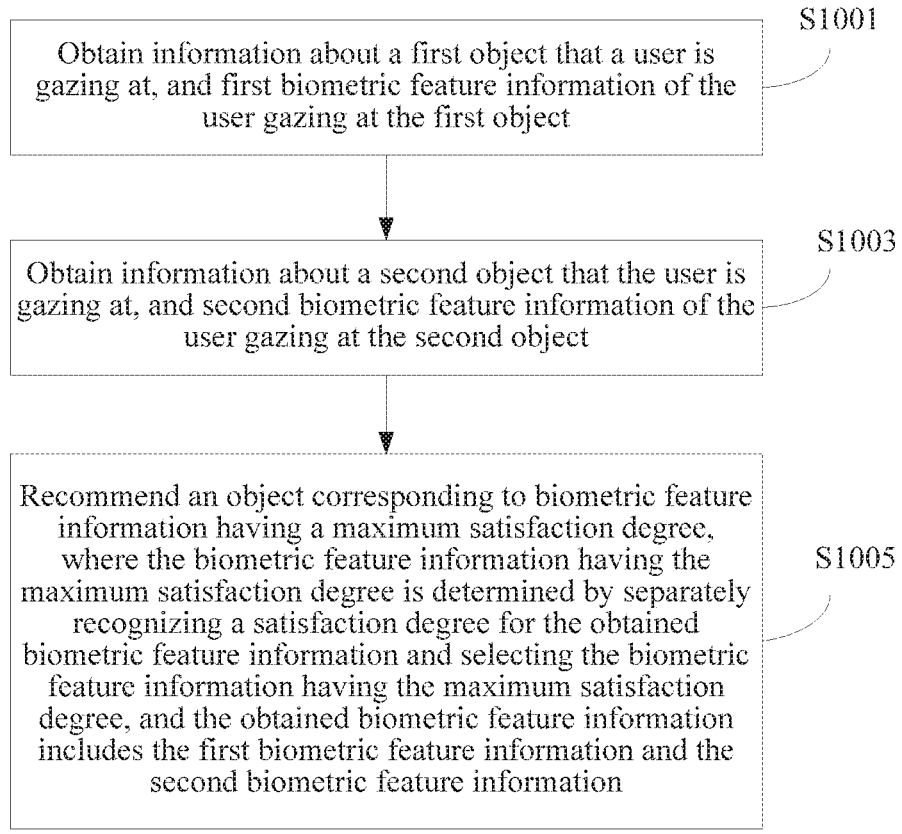
FIG. 10 is a flowchart of yet another embodiment of a method for presenting an object based on a biometric feature according to the disclosure.

An embodiment of the disclosure provides a method for recommending an object based on a biometric feature. As shown in FIG. 10, FIG. 10 is a flowchart of another embodiment of a method for presenting an object based on a biometric feature according to the disclosure. The method includes the following.

S1001. Obtain information about a first object that a user is gazing at, and first biometric feature information of the user gazing at the first object.

S1003. Obtain information about a second object that the user is gazing at, and second biometric feature information of the user gazing at the second object.

S1005. Recommend an object corresponding to biometric feature information having a maximum satisfaction degree, where the biometric feature information having the maximum satisfaction degree is determined by separately recognizing a satisfaction degree for the obtained biometric feature information and selecting the biometric feature information having the maximum satisfaction degree, and the obtained biometric feature information includes the first biometric feature information and the second biometric feature information.

In this embodiment of the disclosure, the method may be implemented by using a head mounted device or wearable smart glasses of the user or another external device facing the user. The information about the first object that the user is gazing at and the information about the second object that the user is gazing at may be obtained by capturing a gazing location of eyes of the user by using a head mounted device or wearable smart glasses of the user or another external device facing the user, where the gazing location of the eyes may be calculated by capturing a gazing direction and locations of pupils of the two eyes, or the gazing location of the eyes of the user may be calculated by combining a location of the user. In an embodiment of the disclosure, the recommended object corresponding to the biometric feature information having the maximum satisfaction degree may be presented by using a wearable device, a computer, or a screen of a television of the user.

Before recommending an object corresponding to biometric feature information having a maximum satisfaction degree in S1005, the method further includes sending the obtained information to a processing device having a stronger processing capability, so that the processing device separately recognizes a satisfaction degree for the obtained biometric feature information, and selects biometric feature information having a maximum satisfaction degree; and receiving the biometric feature information that has the maximum satisfaction degree and that is sent by the processing device.

Figure 11:
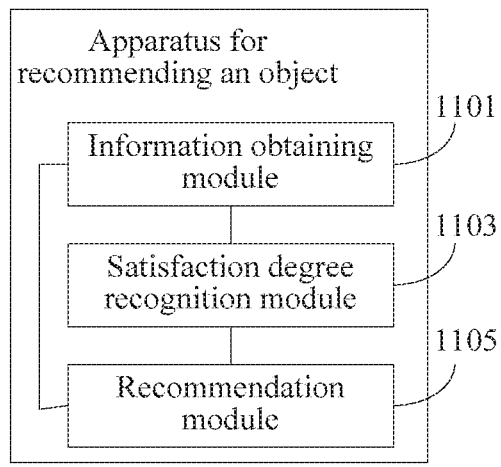
FIG. 11 is a structural diagram of an embodiment of an apparatus for presenting an object based on a biometric feature according to the disclosure.

An embodiment of the disclosure provides an apparatus for recommending an object based on a biometric feature, as shown in FIG. 11. The apparatus includes an information obtaining module 1101, a satisfaction degree recognition module 1103, and a recommendation module 1105. The information obtaining module 1101 is configured to obtain information about a first object that a user is gazing at, and first biometric feature information of the user gazing at the first object, and obtain information about a second object that the user is gazing at, and second biometric feature information of the user gazing at the second object. The satisfaction degree recognition module 1103 is configured to separately recognize a satisfaction degree for the obtained biometric feature information, where the biometric feature information includes the first biometric feature information and the second biometric feature information. The recommendation module 1105 is configured to select biometric feature information having a maximum satisfaction degree from the biometric feature information, and recommend an object corresponding to the biometric feature information having the maximum satisfaction degree.

In an embodiment of the disclosure, the information obtaining module 1101 is further configured to obtain information about a third object that the user is gazing at, and third biometric feature information of the user gazing at the third object. The satisfaction degree recognition module 1103 is configured to separately perform the recognition of the satisfaction degree for the obtained first biometric feature information, the obtained second biometric feature information, and the obtained third biometric feature information.

In an embodiment of the disclosure, the biometric feature information includes an electroencephalogram signal. The satisfaction degree recognition module 1103 is configured to recognize the obtained biometric feature information to separately calculate a focus time of the user. The recommendation module 1105 is specifically configured to select biometric feature information having a longest focus time from the biometric feature information, and recommend an object corresponding to the biometric feature information having the longest focus time.

In an embodiment of the disclosure, the biometric feature information includes one or more information of heart rate information, blood oxygen information, blood pressure information, or pulse information. The satisfaction degree recognition module 1103 is configured to extract a heart rate value, a blood oxygen value, a blood pressure value, or a pulse value of the user from the obtained biometric feature information. The recommendation module 1105 is specifically configured to select biometric feature information having a maximum heart rate value, a maximum blood oxygen value, a maximum blood pressure value, or a maximum pulse value from the biometric feature information, and recommend the biometric feature information having the maximum value.

Figure 12:
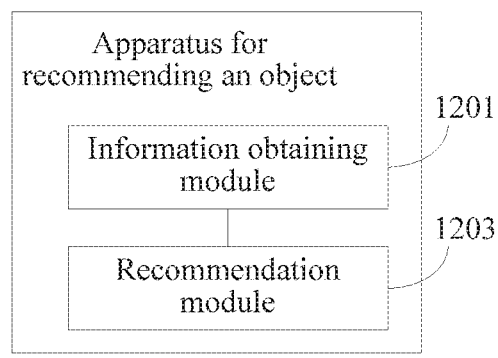
FIG. 12 is a structural diagram of another embodiment of an apparatus for presenting an object based on a biometric feature according to the disclosure.

An apparatus for recommending an object based on a biometric feature is shown in FIG. 12, and FIG. 12 is a structural diagram of an embodiment of an apparatus for presenting an object based on a biometric feature according to the disclosure. The apparatus includes an information obtaining module 1201 and a recommendation module 1203. The information obtaining module 1201 is configured to obtain information about a first object that a user is gazing at, and first biometric feature information of the user gazing at the first object, and obtain information about a second object that the user is gazing at, and second biometric feature information of the user gazing at the second object. The recommendation module 1203 is configured to recommend an object corresponding to biometric feature information having a maximum satisfaction degree, where the biometric feature information having the maximum satisfaction degree is determined by separately recognizing a satisfaction degree for the obtained biometric feature information and selecting the biometric feature information having the maximum satisfaction degree, and the obtained biometric feature information includes the first biometric feature information and the second biometric feature information.

In this embodiment of the disclosure, the information about the first object that the user is gazing at and the information about the second object that the user is gazing at may be obtained by capturing a gazing location of eyes of the user by using a head mounted device or wearable smart glasses of the user or another external device facing the user, where the gazing location of the eyes may be calculated by capturing a gazing direction and locations of pupils of the two eyes, or the gazing location of the eyes of the user may be calculated by combining a location of the user. In an embodiment of the disclosure, the recommended object corresponding to the biometric feature information having the maximum satisfaction degree may be presented by using a wearable device, a computer, or a screen of a television of the user, or is notified by means of speech notification.

In this embodiment of the disclosure, the apparatus for recommending an object is a head mounted device or wearable smart glasses of the user or another external device facing the user.

The apparatus further includes a communications module. Before the recommendation module 1203 is configured to recommend the object corresponding to the biometric feature information having the maximum satisfaction degree, the communications module is further configured to send the obtained information to a processing device having a stronger processing capability, so that the processing device separately recognizes a satisfaction degree for the obtained biometric feature information, and selects biometric feature information having a maximum satisfaction degree; and receive the biometric feature information that has the maximum satisfaction degree and that is sent by the processing device.

Figure 13:
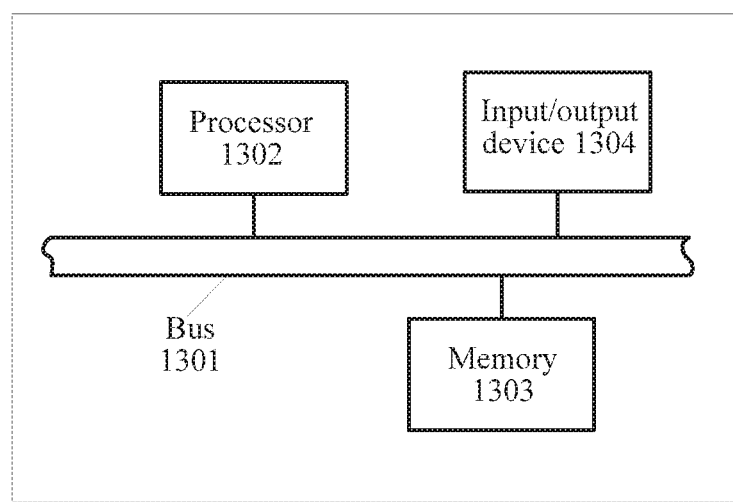
FIG. 13 is a structural diagram of an embodiment of a computer system for presenting and recommending an object based on a biometric feature according to the disclosure.

An embodiment of the disclosure provides a computer system for presenting and recommending an object based on a biometric feature, as shown in FIG. 13. The computer system includes a bus 1301, a processor 1302, a memory 1303, and an input/output device 1304. The processor, the memory, and the input/output device are connected by using the bus. The memory is configured to store data and code. The processor is coupled to the memory; and invokes the data and code of the memory to implement the method for obtaining information about a first object that a user is gazing at, and biometric feature information of the user when the user gazes at the first object; recognizing a satisfaction status for the obtained biometric feature information of the user gazing at the first object; and determining and presenting the information about the second object based on the recognition of the satisfaction status for the biometric feature information of the user gazing at the first object.

In an embodiment of the disclosure, the processor is coupled to the memory, and invokes the data and code of the memory to implement the method for obtaining information about a first object that a user is gazing at, and biometric feature information of the user gazing at the first object, to recognize a satisfaction status for the obtained biometric feature information of the user gazing at the first object; and determining and presenting information about a second object based on the recognition of the satisfaction status for the biometric feature information of the user gazing at the first object.

In an embodiment of the disclosure, the processor is coupled to the memory, and invokes the data and code of the memory to implement the method for obtaining information about a first object that a user is gazing at, and first biometric feature information of the user gazing at the first object; obtaining information about a second object that the user is gazing at, and second biometric feature information of the user gazing at the second object; separately recognizing a satisfaction degree for the obtained biometric feature information, where the biometric feature information includes the first biometric feature information and the second biometric feature information; and selecting biometric feature information having a maximum satisfaction degree from the biometric feature information, and recommending an object corresponding to the biometric feature information having the maximum satisfaction degree.

In an embodiment of the disclosure, the processor is coupled to the memory, and invokes the data and code of the memory to implement the method for obtaining information about a first object that a user is gazing at, and first biometric feature information of the user gazing at the first object; obtaining information about a second object that the user is gazing at, and second biometric feature information of the user gazing at the second object; and recommending an object corresponding to biometric feature information having a maximum satisfaction degree, where the biometric feature information having the maximum satisfaction degree is determined by separately recognizing a satisfaction degree for the obtained biometric feature information and selecting the biometric feature information having the maximum satisfaction degree, and the obtained biometric feature information includes the first biometric feature information and the second biometric feature information.

In an embodiment of the disclosure, the input-'output device 1304 includes a text input device such as a keyboard, a touchscreen, or a mouse, a camera, a tactile function module, and the like. The processor coupled to the memory is further configured to invoke a program or data in the memory to control the camera to collect a picture of a first object, where the first object is a part of a human body, and control the tactile function module to enable a tactile signal to act on the first object.

A person skilled in the art may understand that the accompanying drawings are merely schematic diagrams of exemplary embodiments, and modules or processes in the accompanying drawings are not necessarily required for implementing the disclosure.

A person skilled in the art may understand that the modules in the apparatus provided in the embodiments may be arranged in the apparatus in a distributed manner according to the description of the embodiments, or may be arranged in one or more apparatuses which are different from those described in the embodiments. The modules in the foregoing embodiments may be combined into one module, or split into a plurality of submodules.

A person of ordinary skill in the art may understand that all or a part of the steps of the methods in the embodiments may be implemented by a program instructing relevant hardware. The program may be stored in a computer readable storage medium, including a read only memory (ROM)/random access memory (RAM), a magnetic disk, or an optical disc.

The invention claimed is:

1. A method for presenting an object based on a biometric feature performed by a computer processor of a head mounted device worn by a user, wherein the method comprises:
    obtaining information about a first object at which the user is gazing by capturing a gazing location of eyes of the user;
    obtaining, by a sensor of the head mounted device, biometric feature information of the user gazing at the first object, wherein the biometric feature information comprises electroencephalogram information describing an electroencephalogram signal measuring brain activity of the user, and wherein the electroencephalogram information is a time domain signal of the electroencephalogram signal;
    determining a focus time indicating a length of time during which the user is gazing at the first object by performing at least one of the following:
        performing frequency domain conversion on the time domain signal of the electroencephalogram signal to obtain a frequency domain signal, and calculating an amplitude or frequency change of the frequency domain signal to calculate the focus time;
        calculating an amplitude or frequency change of the time domain signal to calculate the focus time; or
        comparing the electroencephalogram signal with a focus signal sample to determine the focus time based on a relevance between the electroencephalogram signal and the focus signal sample, wherein the focus signal sample is generated in advance using a training model;
    comparing the focus time to a preset threshold to determine whether the user is satisfied with the first object;
    searching an object database for a second object different from the first object in response to the focus time being less than or equal to the preset threshold, wherein a first type of the first object is different from a second type of the second object; and
    causing information about the second object to be presented to the user on a screen of the head mounted device or a screen of another device in response to the focus time being less than or equal to the preset threshold.

2. The method of claim 1, wherein the preset threshold comprises a first preset time threshold and a second preset time threshold, and wherein the method further comprises:
    determining that the user is satisfied with the first object at which the user is gazing when the focus time is longer than the first preset time threshold; and
    determining that the user is not satisfied with the first object at which the user is gazing when the focus time is shorter than the second preset time threshold.

3. The method of claim 1, wherein the method further comprises:

recognizing a mood of the user using the biometric feature information;
determining that the user is satisfied with the first object at which the user is gazing when recognizing that the mood of the user is excited; and
determining that the user is not satisfied with the first object at which the user is gazing when recognizing that the mood of the user is not excited.

4. The method of claim 1, wherein the biometric feature information comprises information describing at least one of heart rate information, blood oxygen information, blood pressure information, or pulse information, and wherein the method further comprises determining that the user is satisfied with the first object at which the user is gazing when the biometric feature information is greater than the preset threshold.

5. The method of claim 1, wherein the characteristic of the first object comprises a type of the first object, and wherein the method further comprises searching an object database for the second object different from the first object based on the type of the first object.

6. The method of claim 1, further comprising causing a different characteristic associated with the second object to be presented to the user.

7. The method of claim 5, further comprising:
recording information about the first object that the user is satisfied with; and
pushing related information of an object within a sight of the user, wherein a type of the object and a type of the first object are the same.

8. The method of claim 1, wherein determining whether the user is satisfied with the first object comprises comparing the biometric feature information with a sample signal of a biometric feature satisfaction signal, and wherein the sample signal of the biometric feature satisfaction signal is generated in advance.

9. The method of claim 1, wherein the biometric feature information comprises information describing at least one of heart rate information, blood oxygen information, blood pressure information, or pulse information, and wherein the method further comprises determining that the user is not satisfied with the first object at which the user is gazing when the biometric feature information is less than the preset threshold.

10. The method of claim 1, wherein the biometric feature information comprises information describing at least one of heart rate information, blood oxygen information, blood pressure information, or pulse information.

11. A head mounted device, comprising:
a sensor configured to collect an electroencephalogram signal measuring brain activity of a user;
a memory configured to store instructions;
a processor coupled to the memory and the sensor, wherein the processor is configured to execute the instructions, which cause the processor to be configured to:
obtain information about a first object at which the user is gazing, wherein the head mounted device is worn by the user;
obtain biometric feature information of the user gazing at the first object, wherein the biometric feature information comprises electroencephalogram information describing the electroencephalogram signal, and wherein the electroencephalogram information is a time domain signal of the electroencephalogram signal;
determine a focus time indicating a length of time during which the user is gazing at the first object, wherein to determine the focus signal, the instructions further cause the processor to perform at least one of the following:
perform frequency domain conversion on the time domain signal of the electroencephalogram signal to obtain a frequency domain signal, and calculating an amplitude or frequency change of the frequency domain signal to calculate the focus time;
calculate an amplitude or frequency change of the time domain signal to calculate the focus time; or
compare the electroencephalogram signal with a focus signal sample to determine the focus time based on a relevance between the electroencephalogram signal and the focus signal sample, wherein the focus signal sample is generated in advance using a training model;
compare the focus time to a preset threshold to determine whether the user is satisfied with the first object;
search an object database for a second object different from the first object in response to the focus time being less than or equal to the preset threshold, wherein a first type of the first object is different from a second type of the second object; and
cause information about the second object to be presented to the user on a screen of the head mounted device or a screen of another device in response to the focus time being less than or equal to the preset threshold.

12. The head mounted device of claim 11, wherein the preset threshold comprises a first preset time threshold and a second preset time threshold, and wherein the instructions further cause the processor to be configured to:
determine that the user is satisfied with the first object at which the user is gazing when the focus time is longer than the first preset time threshold; and
determine that the user is not satisfied with the first object at which the user is gazing when the focus time is shorter than the second preset time threshold.

13. The head mounted device of claim 11, wherein the instructions further cause the processor to be configured to:
recognize a mood of the user using the biometric feature information;
determine that the user is satisfied with the first object at which the user is gazing when the mood of the user is excited; and
determine that the user is not satisfied with the first object at which the user is gazing when the mood of the user is not excited.

14. The head mounted device of claim 11, wherein the biometric feature information comprises information describing at least one of heart rate information, blood oxygen information, blood pressure information, or pulse information, and wherein the instructions further cause the processor to be configured to:
compare the biometric feature information with the preset threshold; and
determine that the user is satisfied with the first object at which the user is gazing when the biometric feature information is greater than the preset threshold.

15. The head mounted device of claim 14, wherein the instructions further cause the processor to be configured to compare the biometric feature information with a sample signal of a biometric feature satisfaction signal, and wherein the sample signal is generated in advance.

16. The head mounted device of claim 11, wherein the characteristic of the first object comprises a type of the first object, and wherein the instructions further cause the processor to be configured to search an object database for the second object different from the first object based on the type of the first object.

17. The head mounted device of claim 11, wherein the instructions further cause the processor to be configured to cause the different characteristic associated with the second object to be presented to the user.

18. The head mounted device of claim 11, wherein the instructions further cause the processor to be configured to:
   record the information about the first object that the user is satisfied with; and
   push related information of an object within a sight of a user, wherein a type of the object and a type of the first object are the same.

19. The head mounted device of claim 11, wherein the biometric feature information comprises information describing at least one of heart rate information, blood oxygen information, blood pressure information, or pulse information, and wherein the instructions further cause the processor to be configured to:
   compare the biometric feature information with the preset threshold; and
   determine that the user is not satisfied with the first object at which the user is gazing when the biometric feature information is less than the preset threshold.

20. The head mounted device of claim 11, wherein the biometric feature information comprises information describing at least one of heart rate information, blood oxygen information, blood pressure information, or pulse information.

* * * * *